United States Patent [19]

Gaylord

[11] 4,086,685
[45] May 2, 1978

[54] HARNESS RELEASE PIN

[75] Inventor: John A. Gaylord, San Diego, Calif.

[73] Assignee: H. Koch & Sons, Anaheim, Calif.

[21] Appl. No.: 751,883

[22] Filed: Dec. 17, 1976

[51] Int. Cl.² .............................................. B64D 17/38
[52] U.S. Cl. ................. 24/201 R; 24/230 R; 244/151 B; 294/83 AE
[58] Field of Search ............ 294/83 R, 83 A, 83 AE; 24/201 R, 201 LP, 230 R, 230 A, 230 AL, 265 R, 265 B; 89/1 B, 1.5 F; 244/151 R, 151 A, 151 B

[56] References Cited

U.S. PATENT DOCUMENTS

| 2,489,984 | 11/1949 | Shoemaker | 294/83 AE X |
| 2,992,467 | 7/1961 | Gaylord | 24/230 AL |
| 3,624,813 | 11/1971 | Gaylord | 294/83 A X |
| 3,712,173 | 1/1973 | Savioli et al. | 24/230 A X |
| 3,744,102 | 7/1973 | Gaylord | 24/230 A |
| 3,845,525 | 11/1974 | Gaylord | 24/230 R X |
| 3,872,556 | 3/1975 | Frost | 24/230 A |
| 4,023,846 | 5/1977 | Poehlmann | 244/151 B X |

FOREIGN PATENT DOCUMENTS 803,518  10/1936  France .................. 24/265 B

Primary Examiner—Johnny D. Cherry
Attorney, Agent, or Firm—George B. White

[57] ABSTRACT

In the legs of a clevis of a webbing connector are opposite aligned passages in which is journalled a pin for harness webbing. The pin is formed of a release body the hub of which fits between the legs. Parts of a pair of lock pins project the hub into the respective passages to hold the pin in place. The lock pins are fixed in the body by shear pins. Inside of the hub are a pair of plungers. A slot in each plunger riding on a set screw limits the outward movement of each plunger respectively to the adjacent end of the hub, whereby the adjacent lock pin is pushed totally into the leg passage and the release body is freed. The force for outward movement of the plungers is imparted through a thruster which includes a suitable expandable device which when expanded axially pushes the plungers apart for pushing the lock pins out of the hub of the release body.

4 Claims, 4 Drawing Figures

HARNESS RELEASE PIN

BACKGROUND OF THE INVENTION

Explosive devices fired for the purpose of releasing connecting elements are known in the art. The principle or sectional pins to be moved out of connecting elements are also known. However prior devices were and are complicated, and the primary object of this invention is to provide a webbing pin of very simple construction and operation and which operates positively and instantaneously when under certain conditions it is vital for the harness wearer to rapidly divest him or her self of encumbrances retained by the usual connector fittings.

DETAILED DESCRIPTION

Figure 1:
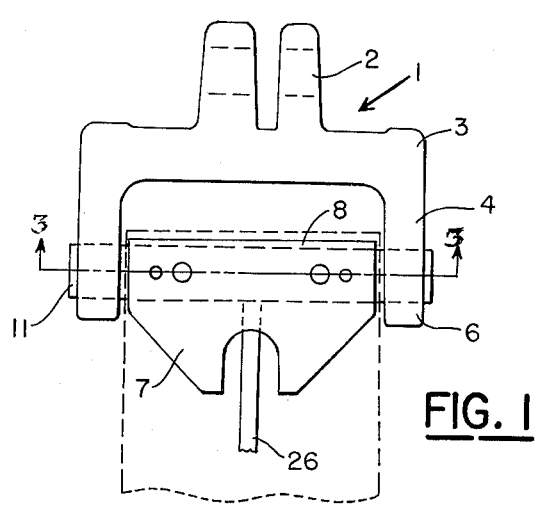
FIG. 1 is a front view of the release pin within the clevis of the male connector element.
Figure 2:
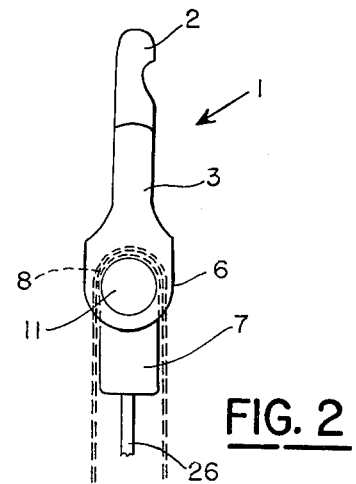
FIG. 2 is a side view of the device shown in FIG. 1.
Figure 3:
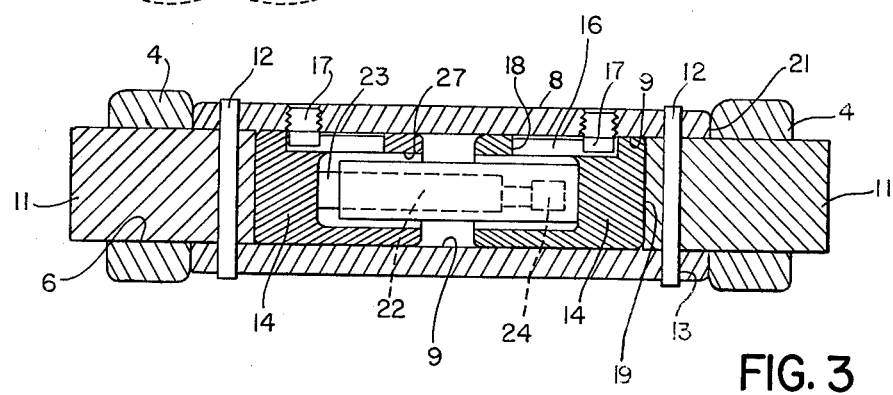
FIG. 3 is a cross sectional view taken on the lines 3—3 with the elements connected.
Figure 4:
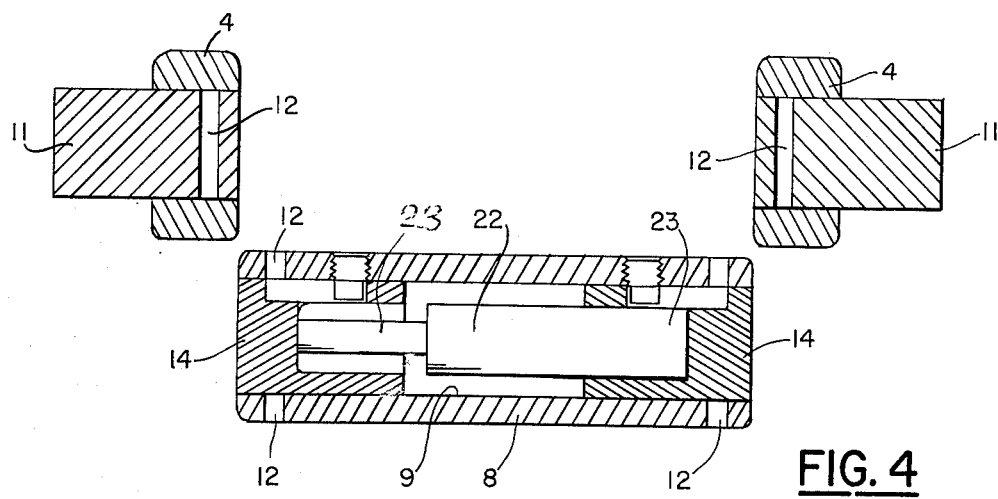
FIG. 4 is a sectional view similar to FIG. 3 showing the release body released.

A male connector member 1 of a webbing connector for a parachute harness has the usual prongs 2 and clevis 3, each leg of which latter has a transverse passage 6. The passages 6 are in registry with one another as shown in FIGS. 3 and 4. The harness webbing pin includes a release body 7, the hub 8 of which fits between the legs 4 so that the axial passage 9 therethrough is in registry with the leg passages 6.

A lock pin 11 extends partly into the passage 9 of the hub 8 and beyond that into the passage 6 of the adjacent leg 4 thereby to journal the release body 1 in the clevis 3. Each lock pin 11 is held in place by a shear pin 12 extending through holes 13 in the hub 8.

Inside of the passage 9 of the hub 8 are axially spaced plungers 14. Each plunger 14 abuts the inside end of the respective adjacent lock pin 11. Each plunger 14 has a longitudinal limit slot 16 in its periphery which rides on the end of a set screw 17 in the adjacent wall of the hub 8. The length of the slot 16 is such that the inner end 18 thereof abuts the adjacent set screw 17 when the outer end 19 of the plunger 14 is in registry with the adjacent outer end 21 of the hub 8. The distance between the inner end 18 of the slot 16 and the set screw 17 equals the distance between the set screw and the adjacent outer end 21 of the hub 8. Thus the plungers 14 push the lock pins 11 out of the release hub 8 and entirely into the passages 6 of the clevis legs 4 thereby to release the hub 8.

The force for pushing the plungers 14 is applied by a suitable expansion element such as a thruster which consists of a cylinder 22 in which operates a piston 23 extending respectively in cavities 27 in the plungers 14. An explosive charge 24 in the cylinder 22 is exploded through an electric cable connection 26.

In operation the explosion of the charge 24 forces the piston 23 and the cylinder 22 in opposite directions and the force so exerted shears the shear pins 12 and pushes the lock pins 11 out of the hub 8 from the position shown in FIG. 3 into the position shown in FIG. 4 and thereby releases the release body and the webbing thereon.

I claim:

1. In a harness release pin
   a connector element having spaced legs and axially registering passages in said legs,
   a release body engageable by a harness webbing,
   a hub of the release body fitting between the legs and having a passage therethrough in axial registry with the passages in said legs,
   a lock pin in each end of the passage of said hub extending into the passage of the adjacent leg to hold said hub in connecting position,
   expandable means between said lock pins for pushing said lock pins apart and out of said hub passage,
   and controlled means to impart a force to such expandable means to expand in opposite directions to push said lock pins out of said hub passage into the respective leg passages for releasing said release body.

2. The harness release pin specified in claim 1, and said expandable means including a pair of plungers engageable with the respective lock pins,
   limiting means in said hub to limit the outward movement of said plungers to where the outer ends of said plungers are in registry with the respective outer ends of said hub.

3. The harness release pin specified in claim 2, and said limiting means being a slot in each plunger,
   and a projecting element extended from said body into each slot, the inner end of each slot being at a distance from the said projecting element equal to the distance between the outer end of the plunger and the adjacent outer end of the hub in the initial connecting position.

4. The harness release pin specified in claim 1, and a shear member holding each lock pin in said passage of said hub and being sheared by the force exerted by said expandable means.

* * * * *